United States Patent [19]

Cambo et al.

[11] Patent Number: 4,687,697
[45] Date of Patent: Aug. 18, 1987

[54] COMPOSITE HAVING IMPROVED TRANSVERSE STRUCTURAL INTEGRITY AND FLEXIBILITY FOR USE IN HIGH TEMPERATURE ENVIRONMENTS

[75] Inventors: William H. Cambo, Rollinsford, N.H.; Elliott F. Whitely, Acton, Me.; Leroy E. Bond, Rochester, N.H.

[73] Assignee: Lydall, Inc., Manchester, Conn.

[21] Appl. No.: 774,709

[22] Filed: Sep. 11, 1985

[51] Int. Cl.$^4$ .................. B32B 5/02; B01D 39/06; B01D 27/06
[52] U.S. Cl. .................. 428/201; 428/219; 428/220; 428/236; 428/285; 428/337; 428/340; 210/504; 210/505; 210/507; 210/509; 210/485; 210/493.5
[58] Field of Search ............... 428/201, 219, 220, 236, 428/285, 337, 340; 210/485, 487, 493.5, 504, 505, 507, 509

[56] References Cited

U.S. PATENT DOCUMENTS 3,553,064  1/1971  Wideman .................. 428/201 X
4,499,134  2/1985  Whitely et al. .................. 428/102

FOREIGN PATENT DOCUMENTS 2082642  3/1982  United Kingdom ............... 428/285

OTHER PUBLICATIONS

Pratt, R. P., "The Performance of Filters Under Hot Dynamic Conditions".
Ruedinger, V., "Development of Gloss Fiber HEPA Filters of High Structural Strength on the Basis of the Establishment of the Failure Mechanisms", 19th DOE/NRC Nuclear Air Cleaning Conference.

Primary Examiner—George F. Lesmes
Assistant Examiner—Susan S. Rucker
Attorney, Agent, or Firm—Murray and Whisenhunt

[57] ABSTRACT

A composite is provided which has improved transverse structural integrity and flexibility and suitable for use in high temperature and high stress environments. The composite has randomly oriented high temperature resistant inorganic fibers interlocked together into a shape sustaining paper with a transverse thickness of from about 0.005 to 0.5 inch. A transverse strength providing high temperature resistant, flexible fabric, made of inorganic fibers is disposed upon at least one of the surfaces of said paper. An organic adhesive is disposed between the paper and the fabric and flexibly bonds the paper to the fabric to form a composite. The composite is sufficiently flexible that it may be folded or pleated without breaking and is capable of being used at high temperatures and at high transverse stresses without rupturing.

19 Claims, 3 Drawing Figures

COMPOSITE HAVING IMPROVED TRANSVERSE STRUCTURAL INTEGRITY AND FLEXIBILITY FOR USE IN HIGH TEMPERATURE ENVIRONMENTS

The present invention relates to a composite having improved transverse structural integrity and flexibility, and which composite is suitable for use in high temperature environments, for example, high temperature fluid filtration.

BACKGROUND OF THE INVENTION

High temperature resistant sheet materials well-known to the art and are used under various high temperature conditions. These sheet materials are known in the art as "papers", since they are often made by method similar to paper-making methods, although the thickness thereof can be up to one half inch or more. These papers are used in a variety of high temperature environments such as protective linings, high temperature insulators, and filter media for high temperature fluids. Most often, these papers are made by laying fibers, particularly inorganic fibers such as ceramic or glass fibers, into a matt and consolidating the matt into a paper, although other processes may be used. The fibers used in making such papers, by virtue of the process of laying the fibers, are randomly oriented and, with consolidation, are interlocked together into the form of a shape sustaining paper having two lateral surfaces. Such a consolidated paper has considerable structural integrity due to the random orientation and interlocking of the fibers, and such structural integrity is quite sufficient for many uses of the papers. However, that inherent structural integrity of the papers is not sufficient for other applications where the papers are subjected to higher stresses, e.g., where the papers are subjected to mechanical action such as abrasion and where the papers are subjected to higher pressures such as in fluid filtration. Under these higher stress environments, the structural integrity of the papers is quickly deteriorated by action of the stresses on the papers and the papers will quickly become unserviceable.

To avoid the loss of structural integrity of the papers when placed in a higher stress environment, these papers often have a binder applied thereto. The binders take various forms, but generally, the binders are organic polymers such as phenolics, acrylics and epoxies. The binders serve to improve the structural integrity of the papers during manufacture and fabrication of the papers into products and maintain that structural integrity in higher stress environments.

However, the binders of these papers, while quite satisfactory for ambient or slightly elevated temperatures, will begin to lose the binding effect at higher temperatures, e.g., about 300°-400° F., with a concomitant loss of structural integrity of the papers. With continued use at these temperatures, the binder will burn away and the structural integrity of the papers will again depend entirely upon the interlocking of the fibers. When this occurs, and when the papers are subjected to stress environments, the papers will quickly fail, e.g., by rupturing, tearing and the like.

In U.S. Pat. No. 4,499,134, the entire disclosure of which is incorporated herein by reference, and a patent of the present assignee, a composite is described which is made of a combination of the papers and an abrasion resistant, high temperature resistant, flexible woven or non-woven scrim. The paper and the scrim are stitched together by a network of abrasion resistant high temperature threads in a repeating pattern. With that composite, even though the binder in the paper burns away in use, the scrim provides structural integrity to the composite and prevents deterioration of the paper when subjected to mechanical action, e.g., abrasion such as encountered in a rotary kiln where the composite is between the kiln wall and the fire bricks. While this composite represents a very substantial improvement in the art, especially in uses where the composite is subjected to mechanical abrasion, it has been found that the composite of that patent is not necessarily acceptable for other high stress environments such as filtration of high temperature fluid streams, and especially where that filtration must be to a very high order of filtration efficiency.

In this latter regard, among other reasons, the needles used for stitching the paper and the scrim together introduce holes through the composite. While the number of these holes is relatively small compared with the total surface area of the composite, nevertheless, these holes do represent a discontinuity in the filtering efficiency of the composite. Such discontinuity can be of substantial significance when the filter is intended for use as a high efficiency filter, as opposed to other general purpose filters such as those which would be used in conventional baghouse filters and the like.

It would be, therefore, of considerable advantage to the art to provide such composites, of the nature described in U.S. Pat. No. 4,499,134, for use at higher temperatures where the binder burns away with use, but wherein the structural integrity of the papers can be largely maintained at the higher temperatures and under the stress conditions without the necessity of stitching the scrim to the papers and without the discontinuities of filter efficiencies.

OBJECTS OF THE INVENTION

It is therefore an object of the present invention to provide a composite, in the nature of U.S. Pat. No. 4,499,134, having improved structural integrity, but without the disadvantages of the composite of the said patent. It is another object of the present invention to provide such a composite having improved transverse structural integrity, so that a transverse stress can be carried thereby, such as the stress encountered in filtration of fluid streams. It is another object of the invention to provide such composite which has flexibility at manufacture so that the composite can be fashioned into complicated geometric shapes, such as are often required by certain filters. It is another object of the invention to provide such composites which may be used in high temperature environments and wherein the structural integrity is largely maintained even with continued use at temperatures where any binder contained in the composite is burned away. It is a further object of the invention to provide such a composite which can be relatively inexpensively made, is easy to manipulate, shape, form and the like, and which can be configured into complex geometric shapes without loss of the structural integrity of flexibility either during manufacture and manipulation. Finally, it is an object of the invention to provide a method for producing such composites. Other objects will be apparent from the following description of the invention and from the annexed claims.

BRIEF DESCRIPTION OF THE INVENTION

The invention is based on four primary discoveries and three subsidiary discoveries. The first discovery is that a composite of the nature described in the said patent can be manufactured by adhesively bonding the paper to a woven or non-woven fabric, while at the same time retaining flexibility of that composite for manipulation, manufacturing and forming purposes. As a subsidiary discovery in connection therewith, it has been surprisingly found that such an adhesive can be either a thermoplastic adhesive or a thermosetting adhesive, and both will allow the composite to be processed and retain the flexibility of the composite. As a further subsidiary discovery in this regard, it has been found that such flexibility can be maintained if the adhesive is not continuously, but discontinuously, disposed between the paper and the fabric, e.g., such as in a pattern of spaced-apart dots of adhesive. The space between the dots of the adhesive, therefor, provides "hinges" for increased flexibility.

A second and most important primary discovery is that once the composite is loaded such that the stress on the composite is substantially in the transverse direction, i.e., along the length and width of the composite, as opposed to the thickness thereof, the inherent friction between the fabric and the paper is such that a very substantial proportion of the transverse structural integrity of the composite is maintained even after the adhesive binding the paper and the fabric together and any binder in the paper have burned away.

A third discovery is that the present composite can be mechanically supported such that it maintains an imposed stress or loading, according to the above-noted second discovery, on the composite, e.g., from a fluid pressure, such that the above-described transverse stress is maintained while the composite is in use, and the maintaining of that transverse stress will retain the structural integrity of the composite by virtue of the above-described friction, even after the adhesive has burned away. As a subsidiary discovery in this regard, it has been found that such mechanical supports should be at fairly closely spaced intervals in order to maintain a transverse stress, as opposed to a perpendicular stress on the composite.

Finally, as a fourth discovery, it has been found that by use of a composite of the present nature, very high filter efficiencies can be achieved and can be maintained in use, at minimal increase in resistance such that filters made of the present composite are quite acceptable for critical filtration applications, e.g., where filter efficiencies of 90% or even 95% or greater are required, since there is essentially no discontinuities in filtration efficiencies, as opposed to the composite of U.S. Pat. No. 4,499,134, as described above.

Thus, very briefly stated, the present invention provides a composite having an improved transverse structural integrity and flexibility, and suitable for use in high temperature environments. The composite comprises randomly laid and oriented high temperature resistant inorganic fibers interlocked together into the form of a shape sustaining paper having two lateral surfaces. The paper has a transverse thickness of from about 0.005–0.5 inch. A transverse strength-providing, high temperature resistant, flexible, woven or non-woven fabric, made of inorganic fibers, is disposed on at least one of the lateral surfaces of the paper. The fabric has a weight of from about 0.25 to 10 ozs. per square yard. An organic adhesive is disposed between the paper and the fabric, and the adhesive flexibly and adhesively bonds the paper and fabric together to form a composite thereof. The composite is sufficiently flexible that it may be folded or pleated without breaking and is capable of being used at high temperatures and high transverse stresses without rupturing.

There is also provided a method for producing such a composite, which method comprises laying high temperature resistant inorganic fibers into a laid matt. The laid matt is then consolidated into a paper of about 0.005–0.5 inch thick and having two lateral surfaces. A transverse strength-providing, high temperature resistant, flexible woven or non-woven fabric is provided. That fabric is made of inorganic fibers and has a weight of from about 0.25 to 10 ozs. per square yard. An organic adhesive is applied to at least one of the lateral surfaces of the paper and/or one of the lateral surfaces of the fabric. The lateral surface of the paper is placed against the lateral surface of the fabric so that the adhesive is at least disposed between those two lateral surfaces to form a composite thereof. The composite is subjected to appropriate conditions to set the adhesive and form a bonded composite thereof.

DETAILED DESCIPTION OF THE INVENTION

Figure 1:
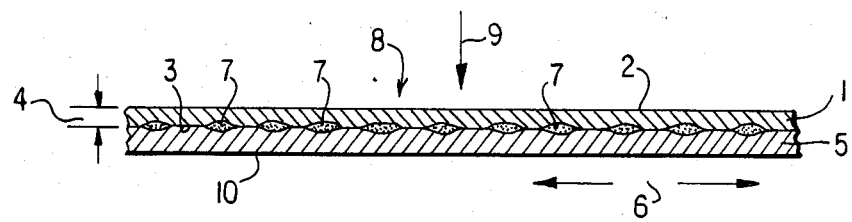
FIG. 1 is a diagrammatic cross-sectioned view of the composite of the present invention.

Before discussing the broader aspects of the invention, the general nature of the composite can be best understood by reference to FIG. 1. In that figure, a paper 1 is made of randomly laid and oriented high temperature resistant inorganic fibers, which fibers are interlocked together by the laying process and form a shape sustaining paper. The paper will have two lateral surfaces, i.e., a first lateral surface 2 and a second lateral surface 3. The overall thickness 4 of the paper will be about 0.005–0.5 inch.

Woven or non-woven fabric 5 is a high temperature resistant, flexible fabric which provides strength to the composite in the transverse direction (such direction shown by arrows 6). That fabric will have a weight of from about 0.25 to 10 ozs. per square yard, especially about 0.5 to 8 oz./yd$^2$. The fabric is disposed upon at least one of lateral surfaces 2 and 3. In FIG. 1, fabric 5 is shown as being disposed on lateral surface 3. However, a further fabric (not shown) may be disposed on lateral surface 2, although the use of two transverse strength providing fabrics is not normally required.

An organic adhesive 7 is disposed between paper 1 and fabric 5. The adhesive flexibly and adhesively bonds paper 1 to fabric 5 to form a composite thereof, generally 8. The adhesive is shown in FIG. 1 as being discontinuously disposed, as will be explained more fully hereinafter. The composite 8, and especially with the discontinuous adhesive as explained hereinafter, is sufficiently flexible that the composite may be folded or pleated without breaking.

Figure 2:
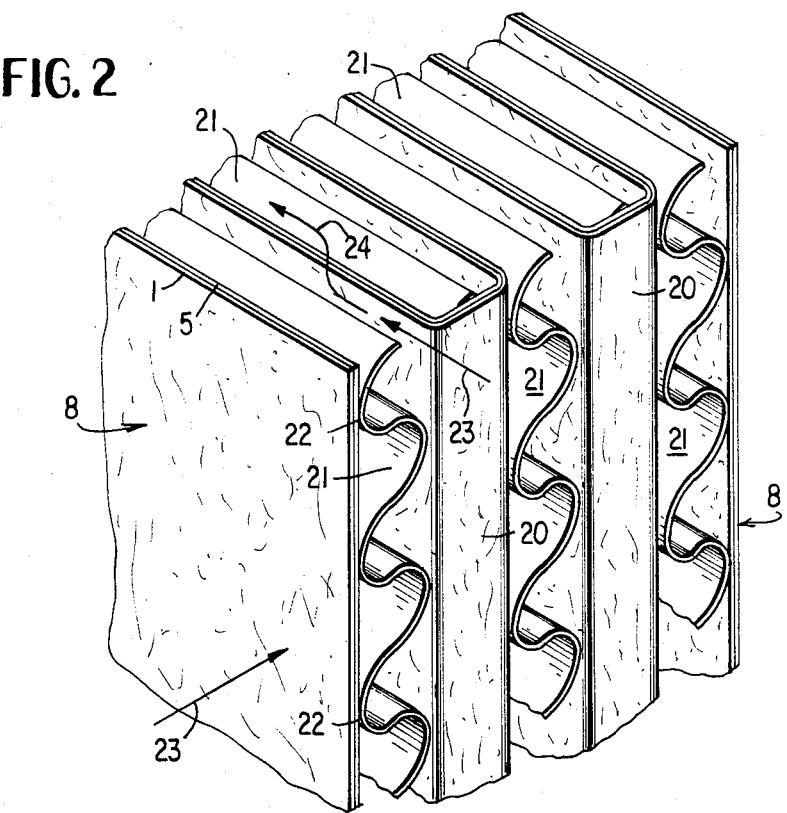
FIG. 2 is a diagramatic perspective view of the composite of the precent invention in a folded and pleated form with mechanical supports associated therewith for use in a conventional fluid filter frame (the frame not being shown).
Figure 3:
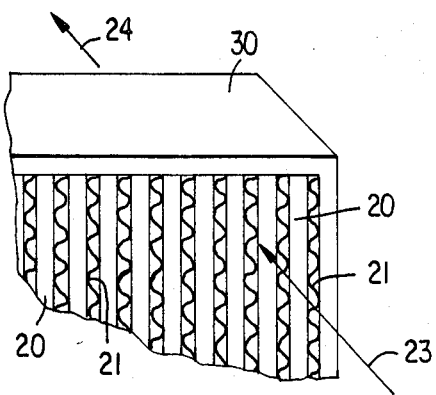
FIG. 3 is a partially broken away perspective view of the composite and supports disposed in a conventional filter frame.

In this latter regard, FIG. 2 shows the composite 8 pleated at pleats 20 and formed into a mechanically supported pleated filter suitable for installation into a conventional fluid filtration frame (not shown in FIG. 2, but see FIG. 3).

Turning now to the adhesive 7 bonding paper 1 and fabric 5, the adhesive may be any of the conventional textile adhesives, both thermoplastic and thermosetting adhesives. Suprisingly a thermoplastic adhesive is satisfactory even though the burning away of a thermoplastic adhesive is more rapid than a thermosetting adhesive. The ability to use a thermoplastic adhesive greatly facilitates manufacture of the composite. For this reason, it is preferred that the adhesive is a thermoplastic adhesive, although a thermosetting adhesive can be used and, indeed, remains in the composite in high temperature use for a longer period of time. Any of the conventional adhesives may be used, including hot melt adhesives such as a polyamides, ethylene vinyl acetate, polyesters and polyolefins, e.g., polyethylene and polypropylene, water based adhesives such as thickened acrylic latex, cross-linkable adhesives such as, cross-linkable polyesters and epoxies.

As is known in the art, however, many adhesives, and especially the higher melt thermoplastic adhesives, and the cross-linkable thermosetting adhesives, are relatively inflexible and often brittle. If the adhesive is continuously disposed between paper 1 and fabric 5 the resulting composite, depending upon the particular adhesive use, can be quite stiff and boardy. The degree of such stiffness and boardiness can be controlled by the amount of adhesive used in a continuous coating on either one lateral surface of paper 1 or fabric 5, for example, when a very thin film of adhesive is used. With such very thin films, some flexibility can still be retained in the composite, but in practical application, it is extremely difficult to place such an accurate thin film of adhesive on either of the lateral surfaces. Therefore, it is preferred that the adhesive be disposed between the paper and the fabric in a discontinuous pattern. Such a discontinuous pattern is shown in FIG. 1 where the adhesive is disposed in a pattern of spaced-apart dots of adhesive 7. Such dots of adhesive can be easily placed on either of the lateral surfaces by a conventional printing process, which will very accurately place the dots of adhesive on one of the lateral surfaces. For example, a conventional rotogravure printing of the dots of the adhesive is quite acceptable.

As can be seen from FIG. 1, spaces are provided between the discontinuous portions of the adhesive, i.e., the dots of adhesive 7, and those spaces are sufficient to maintain flexibility of the composite, even when the dots of adhesive are not in very thin films, but are in substantial thickness, e.g., up to two or three mils. This is because the spaces between the dots of adhesive form "hinges" which allow bending and flexing of the adhesive bonded composite. When the number of dots of adhesive 7 is large and the size of the dots of adhesive 7 is small, a multitude of such "hinges" are formed in the composite and allows considerable flexibility of the composite without breaking either the composite or rupturing the bond between the fabric and the paper of the composite.

The particular size of the dots of adhesive and the number of dots of adhesive are not narrowly critical and it is only necessary that the spaces between the dots of adhesive are sufficient to maintain the flexibility of the composite. However, dot diameters of as little as 5 and up to 100 mils are quite acceptable, and smaller or larger dot sizes may be used, e.g., 1 mil up to an eight of an inch or more. At dot sizes much greater than that, the flexibility of the composite in localized areas can be adversely affected, especially where very sharp folds or pleats are desired, and for that reason smaller dot sizes are preferred. In addition, good flexibility is maintained even when the total area of all dots is up to 60% of the total area of the lateral surface of the paper or fabric upon which the adhesive as used. However, generally, that percentage of area is preferred to be 50% or less. On the other hand, for good strengths, that area should be at least 5% and preferably at least 10 to 20%.

It is quite apparent, however, that the adhesive need not be disposed in the form of a dot, and any other geometric shape may be used. Indeed, no specific shape of discrete dot need be provided, and it is only necessary that there be discontinuities between the dispositions of portions of the adhesive such as to form the "hinges", as explained above. Thus, any pattern may be used so long as that discontinuity is preserved.

It will be appreciated, however, that the foregoing explanation of the adhesive is in connection with the present composite for general utility, and that the disposition of the adhesive is much more critical than the foregoing when the present composite is intended for use as a filter medium, especially a high efficiency filter medium. While very thin, substantially continuous or continuous films can have some fluid porosity, such that the composite could be used as a filter with such thin films of adhesive, reproducible porosities in those thin films of adhesive are very difficult to manufacture and even when reproducibly manufactured, the thin films considerably restrict the flow of fluid through the composite when used as a filter medium. Accordingly, when the composite is intended as a filter medium, the adhesive must be discontinuously disposed, as described above. In addition, the size, number and pattern of the discontinuous adhesive dots is more important, especially for high efficiency filters. Thus, for filter application, the adhesive should be disposed in a discontinuous manner where the pattern of disposition of the adhesive does not occupy more than 40%, and especially not more than 30%, of the lateral surface area of either the fabric or the paper, or both, upon which the adhesive is disposed. Otherwise, the fluid flow through the composite used in a filter application is unduely restricted. More preferably, no more than 25% and especially no more than 20% of such lateral surface area should be occupied by the adhesive. More usually, that lateral surface area occupied by the adhesive will be between about 5% and 20%. Further, for filter use, it is greatly preferred that the disposition of the adhesive be in a constant pattern, so that over the entire lateral surface area of the composite being used for a filter, the resistant to flow of a fluid is essentially uniform. In this regard, a regular repeating pattern of dots of adhesive, e.g., a square, diamond, circular or diagonal pattern, is preferred. Finally, in connection with filter use, the dots should be of smaller dimensions, e.g., between about 5 and 25 mils in diameter (or other maximum lateral dimension of the dots). Such disposition of the adhesive will not only maintain the "hinges" and the resulting flexibility of the composite, but will keep localized restrictions of fluid flows through the composite to a minimum.

In addition to the foregoing requirements, in a filter application, the paper 7 must face the higher pressure of the fluid flowing through the composite. The higher pressure side is shown in FIG. 1 by arrow 9. As can be appreciated, after the adhesive, and binder if used, burns away in use, as explained above, the pressure exerted on paper 1 by the flowing fluid will cause pressure thereagainst. There will be, of course, a pressure drop across the composite 8, with a lower pressure on the outside surface 10 of fabric 5. This pressure differential causes the paper 2 to be pressed against fabric 5 and even after the adhesive has burned away, that pressure and the resulting frictional force between fabric 5 and paper 1 will be sufficient to retain the paper in substantially the same juxtaposition with regard to the fabric 5 as was originally presented in the composite before the adhesive burned away. In addition, since the paper 1 is pressed against the fabric 5, the fabric 5, having substantial transverse strength, will prevent the paper from breaking or "blowing through", as would otherwise occur.

However, even with the support of transverse strength-providing fabric 5, in order to minimize relative movement between paper 1 and fabric 5 after the adhesive has burned away and especially for high efficiency filtration at higher pressures, the composite should be mechanically supported. In FIG. 2, a typical mechanical support is shown by corrugated metal, e.g., aluminum, 21. Other arrangements such as bars, grids and the like may be used, but the corrugated metal of FIG. 2 illustrates the principal involved. The distance between points of support 22 of corrugated metal 21 can vary depending upon the strength of the fabric, the strength of the paper, the pressure of the fluid stream being filtered and the like. However, generally speaking, those points of support should be no more than approximately 10 inches apart, but more preferably should be less than 2 inches apart. For high temperature and high efficiency filtration and in order to minimize movement between the paper and the fabric after the adhesive has burned away, those points of support should be less than 1 inch apart, especially less than 0.5 inch apart, e.g., from 0.2 inch to 0.4 inch apart.

In FIG. 2, as explained above, the fabric 5 is disposed next to the mechanical supports 21 when the fluid flow is in the direction shown by arrows 23 and 24. Of course, this would be reversed if the fluid flow is also reversed from that shown in FIG. 2. For sake of clarity, the enclosure, generally provided by a conventional filter frame, is not shown in FIG. 2. However, FIG. 3 shows a partially broken away section of a conventional filter frame 30 having disposed therein a filter configured in the manner of FIG. 2.

It should be appreciated that the paper of the present composite can be any of the high temperature papers known to the art. For example the papers may be a needled felt, a dry or liquid laid non-woven fabric, or the like, including the more traditional papers made by a process similar to the paper making process. Hence, the details of these papers, and the processes for making those papers, will not be recited herein for sake of conciseness, but instead an overall description of a preferred embodiment of papers and processe therefor will be presented.

Thus, briefly stated, the papers of the preferred embodiment of present invention are randomly laid and oriented heat resistant fibers. The laying, which can be by either a conventional dry-lay or a conventional wet-lay process, causes the fibers to randomly orient and interlock together during the laying process into a matt. The matt is then consolidated into a paper by any one or more of a number of known processes, such as a roto former or a Fourdrinier machine or the like. These papers will, generally, have a thickness of about 0.005 to 0.5 inch, especially 0.01 to 0.3 inch and will generally have an overall bulk density of between 5 and 15 lbs/ft$^3$.

After the paper, with the above characteristics, is prepared, by any selected conventional process, a binder may be applied to the paper. Optionally, a soluble binder may be dissolved in a liquid of a wet process and retained in the paper after consolidation. Further, optionally, the binder may be in the form of soluble or fusable fibers used in a wet or dry process and disposed in the paper as produced. All of the foregoing is well known in the art and no further details are necessary.

It is, however, not necessary to include a binder in the paper at all. This is because the binder will ultimately burn away, for the reasons explained above, and in most cases the required manipulations of the composite in fabrication and installation do not require the added initial structural integrity of the composite provided by a binder in the paper, as opposed to the adhesive between the fabric and paper. When a binder is used the binder will have an affinity for the fibers of the paper and will be sustantially uniformly distributed among those fibers.

A number of binders are known to the art, and are generally organic polymers, although some inorganic polymers and "glasses" have been suggested and used by the art. Nevertheless, the usual binders are made of polyvinylchloride, polyvinylacetate/alcohol, phenolic, acrylic and epoxy polymers. However, if desired the adhesives, described above, may be used as a binder, especially the polyesters, polyamides, and ethylene vinyl acetate. The binders are normally added to the paper at add-ons of from 1% to 20% (the weight of the paper and binder is 1% to 20% greater than the weight of the paper alone).

While the application of the adhesive has been described in detail above, from a processing point of view, the adhesive can be applied by printing, as described above, or by other means conventional in the art, such as jet dot spraying, silk screening, decal application, and the like. The particular means of applying the adhesive is not important, so long as the adhesive is disposed on the lateral surface in the manner described above. Also, as described above, the adhesive can be applied to either the lateral surface of the paper or the lateral surface of the fabric or both, although normally it will be applied to only one lateral surface, and more conventionally applied to the lateral surface of the paper.

After the adhesive is applied to one of the lateral surfaces, the paper and the fabric are placed in contact, one with the other, so that the adhesive is at least disposed between the lateral surfaces. In this regard, as noted above, adhesive can be placed on the other lateral surface of the paper and a second fabric bonded thereto (or the adhesive may be placed on the second fabric and bonded to the other lateral surface of the paper).

Thereafter, the composite is subjected to appropriate conditions for "setting" the adhesive. These conditions vary with the particular adhesive. For example, a hot melt adhesive needs only cooling conditions, usually under some pressure, e.g., running the composite through the nip of cooling cans. Thermosetting adhesives require sufficient heat and pressure for a length of time sufficient to set, e.g., cross-link the adhesive and form a bonded composite. The temperature and times in this latter regard will vary with particular thermosetting adhesive, but generally speaking setting temperatures of 200° to 450° F. are normal for most textile thermosetting adhesives, with times as little as a few seconds up to several minutes. All of this is well known in the art and need not be described herein.

Once the composite has been completed, it is then in a structural stable form and can be manipulated, cut, formed, shaped, and the like, for particular applications thereof. For example, if the fabric is to be used as a filter, it may be folded and/or pleated into the configuration shown in FIG. 2, particularly with mechanical supports disposed therein, for installation into a filter frame, as shown in FIG. 3. The folding and pleating operation, as well as the installation in a conventional filter frame, are all well known in the art and need not be described herein.

The fibers used in producing the paper and fabric will be heat resistant fibers, e.g., inorganic fibers such as glass, metal such as copper, brass, bronze, aluminum and steel, or ceramic fibers. The fibers, as originally manufactured, may be either in staple, microfiber or continuous form. For example, in manufacturing the paper, one method of manufacture is that of extruding an inorganic material, e.g., glass, is continuous filament form, and allowing that continuous filament form to interlock and intertwine, in forming the paper. However, the more usual and more conventionally operated processes for producing the paper utilize staple and/or microfibers, and in these conventional processes, the fibers are formed into papers by wet or dry laid processes, as described above, and consolidated into the more dense paper. The fabrics can be similarly produced, but with additional consolidation for strength purposes, e.g., by needling. However, in regard to the fabric, it is most preferred that inorganic staple fibers be spun into threads and the threads used for weaving the fabric in a conventional manner. Accordingly, in the Specification and following claims, the term "fibers" is to be given the broader definition and include both staple fibers, microfibers and continuous fibers (filaments). In regard to the fiber lengths and in regard to the fiber diameters, these can vary quite widely, e.g., from diameters as low as submicron, to 40 microns or more, e.g., 13 to 15 microns for microfibers and up to large diamers for staple fibers, e.g., 10 denier, or more and the length of the fibers can vary from as little as several thousandths of an inch or even less all the way to continuous filaments as explained above. Thus, in connection with fiber length and diameter, as the above illustrates, these are not critical and may be chosen as desired.

The preferred fibers of the fabric and paper are glass fibers, such as Borosilicate, E, or S glass fibers or ceramic fibers such as silica or aluminum-silica fibers as well as other types of inorganic fiber formulations. However, it is most preferred that the fabric and paper be made of glass fibers.

As noted above, the fabric may be a woven or nonwoven fabric. The specific form of the fabric is not critical and can be, for example, a felted fabric, a woven fabric or woven mesh. It is only necessary that the fabric provide the above described transverse strength, be high temperature resistant, flexible and capable of being securely adhered to the paper. Any of the conventional fabrics made of glass fibers have these characteristics and may be used. These fabrics can be quite light and have a weight of from 0.25 to 10 oz/yd$^2$, although weights of between about 1 and 5 oz./yd$^2$ are preferred.

The present composite may be used in a variety of applications, especially those applications which require high transverse structural integrity and flexibility of a composite, or other textile like material. For example, the present composite is useful as an insulator which must withstand transverse loading usually induced by a perpendicular force applied thereto. This can be simply where the weight of the composite itself induces such a loading, e.g., over long spans of where the composite is used as an insulator and not supported. However, a principal use for the present composite is that of a filter, as described above. The filter need not be in the configuration described above, but can be in the form of various filters such as baghouse filters, plate and frame filters and the like, where transverse loading and high temperatures are encountered. Nevertheless, the form of the filter for which the present composite is ideally suited is a pleated filter of the nature described above. This is particularly true, since with pleated filters very high filter efficiencies (by DOP test per MIL-F-51068E) are achievable. These filters are also eligible for a UL 586 label. By the DOP test (thermally generated dioctylphthalate aerosol with a homogeneous particle size of 0.3 microns), 99.999% minimum filter efficiency can be obtained.

This is, of course, an exceptionally high filtration efficiency and is suited for uses where substantially absolute filtration of very fine particles is required. On the other hand, where the particle size is larger or where the required filtration efficiency is less, DOP filtration efficiencies can be less, e.g., 99% or 90% or even lower. For example, in high temperature paint baking rooms, it is only necessary to filter out, dust, lint, and the like, and DOP filtration efficiencies of only about 50% are required. In other even less demanding applications, a DOP filtration efficiency of only about 15% is required. It should be appreciated, however, that a DOP filtration efficiency is a very severe test, and a 15% efficiency by that test is still an efficient filter.

From the foregoing, it can be seen that these filters can be used in extremely exacting applications and especially in applications where abnormal conditions may occasionally occur. Of course, when using the present composite as a filter the composite, and any supports connected therewith, must be placed in appropriate filter packs and frames with appropriate gasketing and enclosures, to provide a fluid-tight flow of fluid through the filter and not through the frame or pack. These frames, packs and gaskets, are well known to the art and need not be described herein.

The invention will now be illustrated in connection with the following example. However, it will be appreciated that the invention is not limited to the specific example, but extends to the breath of the foregoing disclosure and annexed claims.

EXAMPLE

The paper used in this example is a high-temperature paper made by the Technical Papers Division of Lydall, Inc. and is commercially available as Lydair grade 255. This paper is composed of glass staple and microfibers. The paper is approximately 0.017 inch thick and has a density of approximately 13 lbs/ft$^3$. The paper has an acrylic binder at 6% add-ons.

The fabric used in this example is an industrial glass woven fabric commercially available from the Clark- Schwebel Company as No. 1675. The weight of the fabric is 2.8 oz/yard and is composed mainly of E-glass yards.

The paper was printed with a rotogravure printer to deposit dots of adhesive of approximately 0.005 inch in diameter and approximately 3 mils thick. The pattern of dots of adhesive was a repeating circular pattern and the dots of adhesive occupied approximately 20% of the lateral surface of the paper. The adhesive was a hot melt polyamide adhesive, which is commercially available.

The paper and the fabric were fed to the nip of rolls heated to about 425° F. and which applied a pressure of about 30 pounds per linear inch. The residence in the nip was about 0.25 second.

The composite was passed through a conventional pleating machine and cut and pleated into a pleated filter of 24 inches × 24 inches × 12 inches with aluminum corrugated supports disposed between pleats as shown in FIG. 2. The filter was closed, gasketed and framed in a filter frame as shown in FIG. 3. The filter was used to filter air heated to 1000° F. for 3 days, at which time all adhesive and binder had burned away. A DOP test was run with a 0.9 inch of water pressure drop and the filter efficiency was 99.99%.

Thus, it will seem that the objects of the invention have been achieved.

It will also be appreciated that the present composite may be used in high-temperature applications, other than as a filter, where ordinary papers cannot survive under those conditions. In this regard, the term "high temperature" is defined to mean that temperature at which the adhesive and binder of the paper would burn away. This temperature will vary with the particular adhesive and binder, but generally speaking, the adhesive and binder will burn away at temperature above about 300° to 400° F., and nearly all adhesives and binders will burn away at temperatures in excess of 500° F. Similarly, for purposes of the present Specification and claims the term "high stresses" is defined to mean those environments where ordinary papers, by virtue of the stress action thereon, would quickly loose their structural integrity once the adhesive and binder (if used) is burned away. These terms are well understood and appreciated by those skilled in this art.

We claim:

1. A filter useful in high temperature and high transverse stresses filtration, comprising:
   (A) a composite having improved structural integrity and flexibility and being composed of:
      (1) randomly laid and oriented high temperature resistant inorganic fibers interlocked together into the form of a shape sustaining paper having two lateral surfaces, said paper having a transverse thickness of from about 0.005 to 0.5 inch;
      (2) a transverse strength providing high temperature resistant, flexible, woven or non-woven fabric, made of inorganic fibers, and having a weight of from about 0.25 to 10 oz./yd², disposed upon at least one of the lateral surfaces of said paper; and
      (3) an organic adhesive uniformly applied over the entire surface of one of the paper and the fabric and being disposed between said paper and said fabric in a uniform discontinuous pattern such that no more than 20% of the lateral surface of the finished composite is occupied by the adhesive and the adhesive flexibly and adhesively bonding said paper and fabric together to form the composite thereof;
   (B) mechanical supports means on the low pressure side of the filter and adjacent to the fabric of the composite and spaced-apart no more than 10 inches for resisting high transverse stresses on the composite whereby transverse stresses imposed on the composite during high temperature and high stresses filtration are maintained and the inherent friction between the said fabric and the said paper of the composite caused by said high transverse stresses retains a substantial portion of the transverse structural integrity of the composite after the said adhesive has burned away during said high temperature filtration.

2. The filter of claim 1 wherein the fibers of the paper and fabric are ceramic or glass fibers.

3. The filter of claim 2 wherein the fibers of the paper and fabric are glass fibers.

4. The filter of claim 1 wherein the thickness of the paper is from 0.01 inch to 0.3 inch.

5. The filter of claim 1 wherein the paper has a binder disposed therein.

6. The filter of claim 5 wherein the binder is an organic polymeric binder and the polymer is selected from the group consisting of polyvinylchloride, polyvinylacetate/alcohol, phenolic, acrylic, polyester, polyamides, ethylene vinyl acetate and epoxy polymers.

7. The filter of claim 6 wherein the add on of binder to the paper is from 1% to 20%.

8. The filter of claim 1 wherein the fabric has a weight of from 0.5 to 8 oz/yd².

9. The filter of claim 1 wherein the fabric is disposed on both lateral surfaces of said paper.

10. The filter of claim 1 wherein the adhesive is a thermoplastic adhesive.

11. The filter of claim 1 wherein the pattern is a pattern of spaced apart dots of said adhesive.

12. The filter of claim 1 wherein said dots are printed dots.

13. The filter of claim 11 wherein space is provided between discontinous portions of said adhesive and said spaces are sufficient to maintain the flexibility of said composite.

14. The filter of claim 11 wherein the spaces between the dots are sufficient to maintain the flexibility of said composition.

15. The filter of claim 1 wherein the filter is a pleated filter.

16. The filter of claim 15 wherein the mechanical supports are disposed between pleated sections of the composite.

17. The filter of claim 16 wherein the mechanical supports are corrugated metal.

18. The filter of claim 17 wherein the filter has a DOP efficiency of at least 90%.

19. The filter of claim 18 wherein the efficiency is at least 99%.

* * * * *